United States Patent
Keshavaraj et al.

(10) Patent No.: US 10,471,925 B2
(45) Date of Patent: Nov. 12, 2019

(54) COATED AIRBAG, METHOD FOR MAKING THE SAME, AND AIRBAG MODULE COMPRISING THE COATED AIRBAG

(71) Applicant: Milliken & Company, Spartanburg, SC (US)

(72) Inventors: Ramesh Keshavaraj, Peachtree City, GA (US); Michael D. Hurst, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 15/290,424

(22) Filed: Oct. 11, 2016

(65) Prior Publication Data
US 2017/0028961 A1  Feb. 2, 2017

Related U.S. Application Data
(62) Division of application No. 13/421,106, filed on Mar. 15, 2012, now abandoned.

(51) Int. Cl.
   - B60R 21/235    (2006.01)
   - D06N 3/00      (2006.01)
   - D06N 3/12      (2006.01)

(52) U.S. Cl.
CPC ......... *B60R 21/235* (2013.01); *D06N 3/0006* (2013.01); *D06N 3/0059* (2013.01); *D06N 3/128* (2013.01); *B60R 2021/23514* (2013.01); *D06N 2201/0254* (2013.01); *D06N 2201/0263* (2013.01); *D06N 2203/068* (2013.01); *D06N 2205/16* (2013.01); *D06N 2209/067* (2013.01); *D06N 2209/125* (2013.01); *D10B 2505/124* (2013.01)

(58) Field of Classification Search
None
See application file for complete search history.

(56) References Cited

U.S. PATENT DOCUMENTS

| | | | |
|---|---|---|---|
| 4,964,654 A | 10/1990 | Bishop et al. | |
| 6,171,689 B1 * | 1/2001 | Kaytor | B29C 67/202 428/315.5 |
| 6,177,365 B1 | 1/2001 | Li | |
| 6,177,366 B1 | 1/2001 | Li | |
| 6,220,309 B1 | 4/2001 | Sollars, Jr. | |
| 6,595,244 B1 | 7/2003 | Sollars, Jr. | |
| 7,079,961 B2 | 7/2006 | Sollars, Jr. | |
| 7,409,970 B2 | 8/2008 | Sollars, Jr. | |
| 7,543,609 B2 | 6/2009 | Sollars, Jr. | |
| 7,562,899 B2 | 7/2009 | Hill et al. | |
| 2001/0052689 A1 | 12/2001 | Adomeit et al. | |
| 2004/0254270 A1 * | 12/2004 | Harashina | C08K 3/24 524/86 |
| 2006/0247343 A1 * | 11/2006 | Kishimoto | C08K 5/5313 524/117 |
| 2007/0015425 A1 | 1/2007 | Hill et al. | |
| 2007/0031621 A1 * | 2/2007 | Morimoto | B60R 21/235 428/36.1 |
| 2007/0065614 A1 | 3/2007 | Schulthess | |
| 2008/0036183 A1 | 2/2008 | Keshavaraj et al. | |

FOREIGN PATENT DOCUMENTS

| | | |
|---|---|---|
| EP | 1 548 180 A1 | 6/2005 |
| JP | 2002121378 | 4/2002 |

OTHER PUBLICATIONS

U.S. Appl. No. 13/421,106, filed Mar. 15, 2012, Abandoned.

* cited by examiner

*Primary Examiner* — Shawn Mckinnon
(74) *Attorney, Agent, or Firm* — Robert M. Lanning

(57) ABSTRACT

An airbag comprises a textile substrate and a coating on at least a portion of the surface of the textile substrate. The coating comprises a polyurethane polymer and a phosphorous compound. The phosphorous compound can be selected from the group consisting of esters of phosphoric acid, esters of phosphonic acid, esters of phosphinic acid, and mixtures thereof. An airbag module comprises the above-described airbag, a gas generator, and a cover at least partially enclosing the airbag and gas generator.

9 Claims, No Drawings

COATED AIRBAG, METHOD FOR MAKING
THE SAME, AND AIRBAG MODULE
COMPRISING THE COATED AIRBAG

CROSS REFERENCE TO RELATED
APPLICATIONS

This application claims, pursuant to 35 U.S.C. § 119(e)(1), priority to and the benefit of the filing date of U.S. patent application Ser. No. 13/421,106 filed on Mar. 15, 2012 which application is hereby incorporated by reference in its entirety.

TECHNICAL FIELD OF THE INVENTION

The invention provides a coating composition suitable for use on airbags, an airbag coated with such a composition, a method for making such an airbag, and an airbag module comprising such an airbag.

BACKGROUND

Airbags for motor vehicles have become ubiquitous in passenger vehicles. These airbags are installed at strategic points in the passenger compartment of a vehicle and, in the event of a collision, are rapidly inflated with gas so that they act as an energy absorbing barrier between the vehicle occupant and an interior surface of the passenger compartment (e.g., steering wheel, dashboard, or windows). For example, side curtain airbags typically are installed within one or more of the pillars of the vehicle so that they provide protection during roll-over or side impact collisions. With the advent of such airbags, manufacturers began coating the airbag fabric to modify the gas permeability of the fabric, enabling the airbags manufactured from the fabric to stay inflated for longer periods of time and provided the needed protection during the collision event.

There are many types of coating compositions used to produce such coated fabrics, but one class of coating composition that is quite popular is a dispersion of a polymer in a suitable medium (e.g., aqueous medium). And while these dispersion-based systems are popular, they are not free from drawbacks and difficulties. For example, the polymer must be fairly evenly dispersed within the coating composition in order to produce a coating on the fabric that is of good and consistent quality. The addition of additives (e.g., pigments, fillers, flame retardants, etc.) to such a dispersion can adversely affect the rheology of the dispersion, making it more difficult to produce a coating on the fabric that is of good and consistent quality. Furthermore, particulate additives can be difficult to evenly disperse within the coating composition; and unevenly dispersed particulates in the coating composition will adversely affect the quality of the coating on the fabric. To improve the quality of the dispersion (of both polymer and particulate additives), some have advocated the use of coalescing solvents (e.g., N-methylpyrrolidone). However, the use of coalescing solvents presents its own set of potential problems. For example, the coalescing solvents typically have boiling points that are high enough that they are left behind in the coating on the airbag fabric. But the boiling point of the coalescing solvent is sufficiently low that, once the airbag is installed in a vehicle, the coalescing solvent can begin to volatilize and be released into the passenger compartment of the vehicle.

In view of the foregoing, it can be seen that a need remains for coating compositions and coated airbag fabrics that can meet the demanding needs of the automotive airbag industry while addressing some of the problems inherent in current coating compositions and coated fabrics. Applicants believe that the coating composition and coated airbag described in the present application meet this need.

BRIEF SUMMARY OF THE INVENTION

In a first embodiment, the invention provides an airbag comprising:
(a) a textile substrate, the textile substrate having at least one surface; and
(b) a coating on at least a portion of the surface of the textile substrate, the coating comprising:
(i) a polyurethane polymer; and
(ii) a phosphorous compound selected from the group consisting of esters of phosphoric acid, esters of phosphonic acid, esters of phosphinic acid, and mixtures thereof.

In a second embodiment, the invention provides a method for producing an airbag, the method comprising the step of:
(a) providing a textile substrate, the textile substrate having at least one surface;
(b) providing a coating composition, the coating composition comprising:
(i) a liquid medium;
(ii) a polyurethane polymer; and
(iii) a phosphorous compound selected from the group consisting of esters of phosphoric acid, esters of phosphonic acid, esters of phosphinic acid, and mixtures thereof;
(c) applying the coating composition to at least a portion of the surface of the textile substrate; and
(d) drying the textile substrate to produce a coating on at least a portion of the surface of the textile substrate.

In a third embodiment, the invention provides an airbag module comprising:
(a) an airbag, the airbag enclosing an interior volume and comprising:
(i) a textile substrate, the textile substrate having at least one surface; and
(ii) a coating on at least a portion of the surface of the textile substrate, the coating comprising:
(A) a polyurethane polymer; and
(B) a phosphorous compound selected from the group consisting of esters of phosphoric acid, esters of phosphonic acid, esters of phosphinic acid, and mixtures thereof;
(b) a gas generator, the gas generator being connected to the airbag so that at least a portion of gases produced by the gas generator are directed into the interior volume enclosed by the airbag; and
(c) a cover at least partially enclosing the airbag and the gas generator.

It is believed that the embodiments of the invention described above and in the following description are advantageous for two reasons. First, the phosphorous compound acts a plasticizer for the coating composition, increasing its fluidity and the ease with which it can be applied to the airbag fabric. This permits the formation of a coating that is of good and consistent quality and relatively free of the defects that are often encountered with coatings formed from dispersion-type coating compositions. Second, the phosphorous compound exhibits flame retardant properties and the inclusion of such a compound in the coating composition imparts flame resistance to the coated airbag fabric. This additional benefit of the phosphorous compounds means that the amount of conventional flame retardants (e.g., decabromodiphenyl ether) used in the coating composition can be reduced or even eliminated. Indeed, it is believed that, in some embodiments, the phosphorous compound alone can impart to the fabric the requisite level of flame resistance, thereby eliminating the need to use conventional flame retardants. It is believed that reducing the amount of or eliminating these conventional flame retardants will increase the quality of the coating on the airbag fabric, all while maintaining the required level of flame resistance.

DETAILED DESCRIPTION OF THE INVENTION

In a first embodiment, the invention provides an airbag. The airbag can be suitable for use as any airbag in a motor vehicle, such as a frontal impact airbag (e.g., driver or passenger-side frontal impact airbag) or a side impact airbag (e.g., side curtain airbag or side torso airbag). The airbag comprises a textile substrate and a coating on at least a portion of the textile substrate. The airbag can also be configured to enclose an interior volume. For example, the airbag can comprise at least two discrete textile substrates that are sewn, stitched, or otherwise bonded together in such a way as to enclose an interior volume that can be inflated. Alternatively, the airbag can be a one-piece woven airbag, which essentially comprises a textile substrate having two layer areas and single layer areas where the two layers are woven together to enclose an interior volume that can be inflated. Such one-piece woven airbags and suitable constructions for the same are described, for example, in U.S. Pat. Nos. 7,543,609; 7,409,970; 7,069,961; 6,595,244; and 6,220,309.

The textile substrate of the airbag can be any suitable textile substrate. Preferably, the textile substrate is a woven fabric. Such woven fabrics comprise a plurality of yarns interlaced in a suitable weave pattern, such as a plain weave, twill weave or a satin weave. Preferably, the textile substrate is a woven fabric constructed in a plain weave. The woven fabric can be constructed from any suitable yarn or combination of yarns. Preferably, the textile substrate is a woven fabric comprising a plurality of synthetic yarns. The synthetic yarns can comprise any suitable synthetic fibers. Preferably, the synthetic yarns comprise fibers selected from the group consisting of polyamide fibers (e.g., nylon 6 fibers, nylon 6,6 fibers), polyester fibers (e.g., polyethylene terephthalate fibers, polytrimethylene terephthalate fibers, polybutylene terephthalate fibers), polyolefin fibers, and mixtures thereof. In a more preferred embodiment, the synthetic yarns comprise fibers selected from the group consisting of polyamide fibers, polyester fibers, and mixtures thereof.

The yarns used in making the textile substrate can have any suitable linear density. Preferably, the yarns have a linear density of about 100 dtex or more or about 110 dtex or more. Preferably, the yarns have a linear density of about 1,500 dtex or less, or about 700 dtex or less. The yarns used in making the textile substrate preferably are multifilament yarns, which means each yarns comprises a plurality of filaments or fibers, such as those mentioned above. In such multifilament yarns, the filaments or fibers preferably have linear densities of about 7 dtex or less, or about 5 dtex or less (e.g., about 4.5 dtex or less).

In addition to the textile substrate, the airbag also comprises a coating on at least a portion of the surface of the textile substrate. Preferably, the coating is substantially coextensive with the surface of the textile substrate, or at least substantially coextensive with that portion of the surface that overlies the enclosed volume of the airbag. The coating can be present on the textile substrate in any suitable amount. Preferably, the coating is present on the textile substrate in an amount of about 10 $g/m^2$ or more, about 15 $g/m^2$ or more, or about 20 $g/m^2$ or more. Preferably, the coating is present on the textile substrate in an amount of about 50 $g/m^2$ or less, about 45 $g/m^2$ or less, about 40 $g/m^2$ or less, or about 35 $g/m^2$ or less. Thus, in certain preferred embodiments, the coating is present on the textile substrate in an amount of about 10 $g/m^2$ to about 50 $g/m^2$ (e.g., about 15 $g/m^2$ to about 50 $g/m^2$), about 15 $g/m^2$ to about 45 $g/m^2$, about 20 $g/m^2$ to about 40 $g/m^2$, or about 20 $g/m^2$ to about 35 $g/m^2$.

The coating on the textile substrate comprises a polyurethane polymer and a phosphorous compound. In addition to these two components, the coating can comprise other components, such as polymers or resins, thickeners, antioxidants, flame retardants, curing agents, coalescing agents, adhesion promoters, fillers, antiblocking agents, crosslinking agents, slip agents, pigments, and colorants. For example, the coating can comprise one or more additional polymers or resins selected from the group consisting of acrylic polymers, styrene-butadiene rubbers, polyvinyl chloride polymers, polyolefin polymers, polyvinyl alcohol polymers, silicone polymers, ethylene-vinyl acetate polymers, ethylene propylene diene monomer (EPDM) polymers, polyurea polymers, acrylonitrile-butadiene-styrene (ABS) terpolymers, and mixtures thereof.

The polyurethane polymer in the coating can be any suitable polyurethane polymer. As used herein, the term "polyurethane polymer" refers to polymers containing monomer units joined by urethane (carbamate) links. The term refers to both "conventional" polyurethane polymers (e.g., a polyurethane polymer produced by the reaction of one or more polyisocyanates with one or more polyols) and polyurethane hybrid polymers. The term "polyurethane hybrid polymers" refers to polymers containing monomer units joined by urethane links and monomer units joined by another type of linkage (e.g., a siloxane linkage or a linkage derived from the polymerization of a vinyl monomer). Suitable polyurethane hybrid polymers include, but are not limited to, urethane-acrylic hybrid polymers and urethane-silicone hybrid polymers (urethane-siloxane hybrid polymers). The polyurethane polymers suitable for use in the invention include those commonly used in airbag coatings, such as the polyurethane polymers available from Chemtura Corporation (e.g., Witcobond® polyurethane dispersions), The Lubrizol Corporation (e.g., Sancure® polyurethane dispersions), Stahl USA Inc., Hauthaway Corporation, The Dow Chemical Company, and Cytec Industries Inc.

The phosphorous compound in the coating can be any suitable phosphorous compound. The coating can comprise one or more of such phosphorous compounds. Thus, in certain embodiments, the coating can comprise one of the phosphorous compounds described below or a mixture of two or more of the phosphorous compounds described below. Preferably, the phosphorous compound is selected from the group consisting of esters of phosphoric acid, esters of phosphonic acid, esters of phosphinic acid, and mixtures thereof.

In a preferred embodiment, the coating comprises a phosphorous compound conforming to the structure of Formula (I) below:

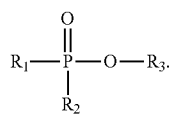

(I)

In the structure of Formula (I), $R_1$ is selected from the group consisting of alkyl groups, haloalkyl groups, aminoalkyl groups, aryl groups, haloaryl groups, aralkyl groups, and groups conforming to the structure —O—$R_4$, and $R_2$ is selected from the group consisting of alkyl groups, haloalkyl groups, aminoalkyl groups, aryl groups, haloaryl groups, aralkyl groups, and groups conforming to the structure –O—$R_5$. $R_3$ is selected from the group consisting of alkyl groups, haloalkyl groups, aryl groups, haloaryl groups, aralkyl groups and groups conforming to the structure of Formula (II) below:

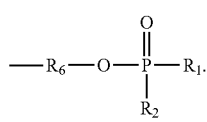

(II)

$R_4$ and $R_5$ are independently selected from the group consisting of alkyl groups, haloalkyl groups, aryl groups, haloaryl groups, and aralkyl groups, and $R_6$ is selected from the group consisting of arylene groups, aralkylene groups, and poly(oxyalkylene) groups. In a preferred embodiment, when $R_3$ is a group conforming to the structure of Formula (II), $R_1$ is a group conforming to the structure —O—$R_4$, and $R_2$ is a group conforming to the structure –O—$R_5$.

In a preferred embodiment, the coating comprises a phosphorous compound conforming to the structure of Formula (I) in which $R_3$ is a group conforming to the structure of Formula (II), $R_1$ is a group conforming to the structure —O—$R_4$, $R_2$ is a group conforming to the structure —O—$R_5$, $R_4$ and $R_5$ are each phenyl groups, and $R_6$ is a phenyl group (i.e., a divalent phenyl group). In another preferred embodiment, the coating comprises a phosphorous compound conforming to the structure of Formula (I) in which $R_1$ is a group conforming to the structure —O—$R_4$, $R_2$ is a group conforming to the structure —O—$R_5$, $R_4$ and $R_5$ are each phenyl groups, and $R_3$ is a methylphenyl group (e.g., a 2-methylphenyl group, a 3-methylphenyl group, or a 4-methylphenyl group). In such an embodiment, $R_3$ preferably is a 3-methylphenyl group. In another preferred embodiment, the coating comprises a phosphorous compound conforming to the structure of Formula (I) in which $R_1$ is a group conforming to the structure —O—$R_4$, $R_2$ is a group conforming to the structure —O—$R_5$, and each of $R_3$, $R_4$, and $R_5$ are 1,3-dichloro-2-propyl groups (i.e., 1,3-dichloropropan-2-yl groups). In another preferred embodiment, the coating comprises a phosphorous compound conforming to the structure of Formula (I) in which $R_1$ is a group conforming to the structure —O—$R_4$, $R_2$ is a group conforming to the structure —O—$R_5$, and each of $R_3$, $R_4$, and $R_5$ are 1-chloro-2-propyl groups (i.e., 1-chloropropan-2-yl groups). And in another preferred embodiment, the coating comprises a phosphorous compound conforming to the structure of Formula (I) in which $R_1$ is a group conforming to the structure —O—$R_4$, $R_2$ is a group conforming to the structure —O—$R_5$, and each of $R_3$, $R_4$, and $R_5$ are aryl groups.

The phosphorous compound(s) can be present in the coating in any suitable amount. As will be understood by those of ordinary skill in the art, the amount of the phosphorous compound needed in a particular coating may depend upon a variety of factors, such as the polyurethane polymer in the coating, the particular phosphorous compound(s), and the types and amounts of any additional components present in the coating. Preferably, the phosphorous compound is present in the coating in an amount of about 1 part or more, about 5 parts or more, or about 10 parts or more per 100 parts of the polyurethane polymer. Preferably, the phosphorous compound is present in the coating in an amount of about 100 parts or less, about 80 parts or less, about 60 parts or less, or about 50 parts or less per 100 parts of the polyurethane polymer. Thus, in a preferred embodiment, the phosphorous compound is present in the coating in an amount of about 1 to about 100 parts, about 1 to about 80 parts, about 5 to about 60 parts (e.g., about 5 to about 50 parts), or about 10 to about 60 parts (e.g., about 10 to about 50 parts) per 100 parts of the polyurethane polymer. When more than one phosphorous compound is present in the coating, each individual phosphorous compound can be present in the coating in an amount falling within one of the ranges described above, or each of the phosphorous compounds can be present in the coating in an amount that will yield a total content of phosphorous compounds that falls within one of the ranges described above. In a preferred embodiment containing two or more phosphorous compounds, each phosphorous compound is present in the coating in an amount that will yield a total content of phosphorous compounds that falls within one of the ranges described above.

The airbag of the invention can be made by any suitable method or process. However, in another embodiment, the invention provides a method for producing an airbag. The method generally comprises the steps of providing a textile substrate, providing a coating composition, applying the coating composition to at least a portion of the surface of the textile substrate, and drying the textile substrate to produce a coating on the textile substrate. The textile substrate utilized in this method can be any suitable textile substrate, including those textile substrates described above in connection with the airbag embodiment of the invention.

The coating composition utilized in this method comprises a liquid medium, a polyurethane polymer, and a phosphorous compound. The liquid medium can comprise any suitable liquid, such as water, an organic solvent, or a mixture thereof. The liquid medium can contain such other suitable components as are necessary or convenient to render the coating composition stable and suitable for use. Such additional components include, but are not limited to, surfactants and/or dispersing agents. The liquid medium typically provides a medium in which the polyurethane polymer is dispersed or suspended. These surfactants and/or dispersing agents can be used to stabilize this dispersion or suspension. The polyurethane polymer and phosphorous compound present in the coating composition can be any suitable polymer and compound, including those discussed above in connection with the airbag embodiment of the invention. The coating composition can contain other additives and fillers, including those discussed above in connection with the coating in the airbag embodiment of the invention.

The coating composition can be applied to the textile substrate by any suitable means or process. For example, the coating composition can be applied to the textile substrate by knife-over-air coating, knife-over-roll coating, transfer coating, and extrusion coating.

After application of the coating composition, the textile substrate is dried to form a coating on the textile substrate. The textile substrate can be dried under any suitable conditions. For example, the textile substrate can be dried by exposing the coated substrate to ambient temperatures for a time sufficient for the liquid medium to evaporate and result in a coating on the textile substrate. Typically, in order to hasten the drying process, the textile substrate is exposed to elevated temperatures for a time sufficient to evaporate a substantial amount of the residual liquid medium (e.g., water, solvent, or mixture thereof) from the coating composition. In the drying process, the textile substrate can be exposed to any suitable elevated temperature, provided the temperature is not so high as to damage the textile substrate or the coating that is formed on the textile substrate.

In a third embodiment, the invention provides an airbag module. The airbag module comprises an airbag, a gas generator, and a cover. The airbag can be any suitable airbag, including the airbag described above in connection with the first embodiment of the invention or an airbag produced in accordance with the method embodiment of the invention. The gas generator in the airbag module can be any suitable apparatus that rapidly produces a sufficient volume of gas (or a mixture of gases) to fill the interior volume of the airbag. Suitable gas generators are known to those of ordinary skill in the art, and it is believed that any of these known gas generators will be suitable for use in making the airbag module described herein. The gas generator is connected to the airbag so that at least a portion of the gases generated by the airbag are directed into the interior volume enclosed by the airbag. The airbag module further comprises a cover that at least partially encloses the airbag and the gas generator. The cover can be made from any suitable material, such as a rigid plastic that will protect the airbag and gas generator when they are installed in the motor vehicle.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for producing an airbag, the method comprising the step of:
   (a) providing a textile substrate, the textile substrate having at least one surface;
   (b) providing a coating composition, the coating composition comprising:
      (i) a liquid medium;
      (ii) a polyurethane polymer; and
      (iii) a phosphorous compound of Formula (I) below

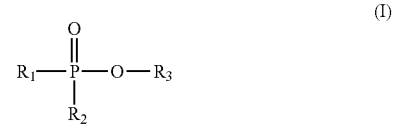

wherein $R_1$ is —O—$R_4$ and $R_4$ is an aryl group; $R_2$ is —O—$R_5$ and $R_5$ is an aryl group; $R_3$ is a group of Formula (II) below:

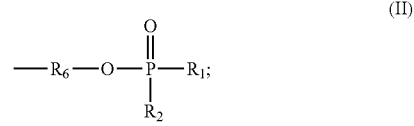

and $R_6$ is an arylene group;
   (c) applying the coating composition to at least a portion of the surface of the textile substrate; and $R_6$ is an arylene group; and
   (d) drying the textile substrate to produce a coating on at least a portion of the surface of the textile substrate.

2. The method of claim 1, wherein the textile substrate is a woven fabric comprising a plurality of synthetic yarns.

3. The method of claim 2, wherein the synthetic yarns comprise fibers selected from the group consisting of polyamide fibers, polyester fibers, polyolefin fibers, and mixtures thereof.

4. The method of claim 1, wherein the phosphorous compound is present in the coating composition in an amount of about 1 part to about 80 parts per 100 parts of the polyurethane polymer.

5. The method of claim 4, wherein the phosphorous compound is present in the coating composition in an amount of about 10 to about 60 parts per 100 parts of the polyurethane polymer.

6. The method of claim 1, wherein $R_4$ and $R_5$ are phenyl.

7. The method of claim 6, wherein $R_6$ is a divalent phenyl group.

8. The method of claim 7, wherein the phosphorous compound is present in the coating composition in an amount of about 10 to about 60 parts per 100 parts of the polyurethane polymer.

9. The method of claim 8, wherein the liquid medium comprises water, and the polyurethane polymer is dispersed in the liquid medium.

\* \* \* \* \*